United States Patent [19]

Kühnle et al.

[11] 4,253,346

[45] Mar. 3, 1981

[54] ELECTROHYDRAULIC SPEED-CHANGE DEVICE FOR A LOAD-SHIFTABLE REVERSING TRANSMISSION FOR AN AUTOMOTIVE VEHICLE

[75] Inventors: Willi Kühnle, Friedrichshafen; Heinz Wendler, Meckenbeuren, both of Fed. Rep. of Germany

[73] Assignee: Zahnradfabrik Friedrichshafen AG, Friedrichshafen, Fed. Rep. of Germany

[21] Appl. No.: 867,142

[22] Filed: Jan. 5, 1978

[30] Foreign Application Priority Data

Jan. 12, 1977 [DE] Fed. Rep. of Germany ....... 2700962

[51] Int. Cl.[3] .......................... F16H 5/56; F16H 5/58

[52] U.S. Cl. .................................. 74/861; 74/752 A; 74/866

[58] Field of Search ..................... 74/866, 752 D, 869, 74/856, 861, 752 A

[56] References Cited

U.S. PATENT DOCUMENTS

| | | | |
|---|---|---|---|
| 3,354,744 | 11/1967 | Kühnle et al. | 74/866 X |
| 3,662,625 | 5/1972 | Wakamatsu et al. | 74/866 |
| 4,026,169 | 5/1977 | Kühnle et al. | 74/861 |
| 4,041,809 | 8/1977 | Dick et al. | 74/752 D X |
| 4,073,204 | 2/1978 | Dick | 74/752 D X |

*Primary Examiner*—Rodney H. Bonck
*Attorney, Agent, or Firm*—Karl F. Ross

[57] ABSTRACT

An electrohydraulic speed change system for a load-shiftable gear transmission of an automotive vehicle in which hydraulic devices such as clutches and brakes are operated by electromagnetic actuation of respective valves of the hydraulic system. The speed selection is effected by a series-connected array of switches and the circuit means provided for actuation of the electromagnetic valve includes time-delay networks operating an interrupter switch in series with this array.

5 Claims, 4 Drawing Figures

+
T
8
19
9
20
10
21
R5
R6
R7
R11
1
2
3
4
5
6
7
11
22
23
24
25
26
27
28
29
30
31
32
33
34
35
36
37
39
18
t1
t2
H
R
L
S 15
13
1
12
13a
17
14
16
16a
5
6
7
11
+

ELECTROHYDRAULIC SPEED-CHANGE DEVICE FOR A LOAD-SHIFTABLE REVERSING TRANSMISSION FOR AN AUTOMOTIVE VEHICLE

FIELD OF THE INVENTION

The present invention relates to an electrohydraulic speed changer for a load-shiftable multispeed and reversible gear transmission for manual or automatic speed selection in a motor vehicle.

More particularly, the invention relates to a circuit for the electrical control of the load transfer between different gear trains of a transmission having hydraulic devices, such as friction clutches or brakes, controlled by electromagnetic valves and selectively actuated to establish the respective speeds.

BACKGROUND OF THE INVENTION

A load-shiftable transmission, particularly in an automotive vehicle, has an input shaft connected with a drive source such as the internal-combustion engine and an output shaft connected to a load such as the wheels of the vehicle. Between the input shaft and the output shaft, there are provided a multiplicity of continuously meshing gears which cooperate with respective friction devices, such as friction clutches or brakes, which can be hydraulically actuated to limit relative rotation of parts of the drive or to couple parts of the drive together and thereby establish respective force-transmitting paths between the input and output shafts with different transmission ratios corresponding to the "speeds," "gears" or steps of the transmission. For convenience, these various transmission ratios will be referred to hereafter as "speeds."

It is known, for example, from U.S. Pat. No. 4,026,169 to provide an electric circuit for the electrohydraulic actuation of such a transmission. To this end, each of the hydraulic devices, e.g. the friction clutches, is associated with an electromagnetic valve which, when energized, permits hydraulic filling of the device and thus selection of the associated speed of the transmission. The electromagnetic valves are, in turn, energized by an array of switches.

One of the problems with such a system is that a certain overlap of the switches of the friction devices is necessary to effect smooth transfer of the driving action from one bear train to another, e.g. the shifting of one gear train should overlap the release of the other gear train at least under some conditions.

To accomplish this with a system in which the manual or automatic shifting is effected by electrohydraulic means, it is necessary to provide for an overlap of the switched-on and switched-off states of the electromagnetic valves for the newly selected speed and the previous speed, respectively. This is accomplished by providing time delay switches which ensure a lag in opening the electromagnetic valve for the previous speed when the next speed is selected. Naturally, the overlappingly operated friction devices slip during this overlap. As a consequence a jolt-free transfer is effected in shifting from one speed to another.

The time-delay switch of this earlier system has, at the input side, working contacts connected to a common voltage source while the output side is connected to the respective electromagnetic valve. The working contacts are thus in a so-called parallel connection.

When such a circuit is damaged or disrupted such that two contacts remain closed, e.g. because one does not open sufficiently quickly because of a malfunction of the time-delay network, the associated clutches remain engaged for a corresponding duration so that two speeds may be practically rigidly connected between the input shaft and the load. Naturally this can damage the gear trains or destroy the clutches.

OBJECT OF THE INVENTION

It is the object of the present invention, therefore, to improve upon the system described in U.S. Pat. No. 4,026,169 so as to avoid the disadvantages mentioned previously and, more specifically, provide an electrical actuating system in which an excessively lengthy overlap of the actuated state will not occur.

SUMMARY OF THE INVENTION

This object and others which will become apparent hereafter are attained, in accordance with the present invention by providing the working contacts (as single-pole double-throw switches) in a series-connected chain and connecting, ahead of the input to this chain, an interrupter contact which selectively upon actuation of a changeover contact is opened for a predetermined duration.

This circuit delays the switching in of the electromagnetic valve associated with the next speed and in spite of interruption of the fluid flow by deenergization of the respective electromagnet, causes the clutch to slowly disengage.

Upon the lapse of the time period, the interrupter contact is then again closed and energized the newly selected electromagnetic valve for the new speed when the previously energized clutch is cut off. The time period established by the opening of the interrupter contact then defines the overlap period between the successively actuated clutches.

The series connection of the change-over contacts itself ensure reliable actuation of the individual change-over contacts since undesired simultaneous and full switching in of two clutches is impossible. This is because the reversal of the position of each of the switch-over contacts of the chain automatically cuts off the immediately following changeover contact.

In other words, the present invention uses the principle of preventing overlap of actuating of the switchover contacts while ensuring an overlap in the operations of the clutches in shifting from one speed to another. This result is obtained by providing for the slow decrease in the shifting pressure of the first clutch and the energization of the second only after the oil pressure at the first has fallen to a predetermined value.

The period of overlap can be selected at any level from zero to the maximum possible level as may be required without difficulty. When the interrupter contact is open for a relatively long interval, the two speeds can be shifted with practically no overlap since the first clutch can be drained to zero clutch effectiveness before the second clutch is switched in. When the time period is held to the minimum level a relatively large overlap can be provided, e.g. the second clutch can be switched in practically as soon as the draining of the first clutch is commenced.

Within the principle of the present invention it is possible to vary the intervals depending upon the nature of the gear-changing or speed-shifting operation. For example, overlap is desired for shifting in a new gear or out of a speed when in the new speed the engine should operate at a lower RPM rate in the preceding speed. The overlap is thus effected to establish a new and lower output speed of the engine.

This condition obtains when a shiftup is desired under load. The overlap is also desirable when a downshift is to be effected during, for example, down-hill travel in which the new speed must result in a higher RPM level for the engine. The overlapping thus serves to permit compensation by the engine for the down shifting because at the inception thereof the fuel supply to the engine is lower than desirable.

By upshifting in a down-hill movement of the vehicle, the engine is given less fuel so that it has a tendency to reduce its speed. This tendency can be compensated by eliminating the overlap and thereby permit the inertia of the system to allow the engine to reach its new lower RPM.

In down shifting under load, where the engine is operated at low speed with high fuel input, again a zero overlap and even a slight lag between speeds is desired to permit the motor speed to increase for the higher RPM in the lower speed position.

The electromagnetic valves of the present invention, which must provide for the slow pressure drop in their deenergized positions, can be provided with throttles which are brought into play when the respective valve is deenergized in the manner described.

The control of the opening permits between maximum time delay and zero or minimum time delay can be effected by using a logic circuit which response to the upshifting or downshifting and the state of vehicle movement (under load or under engine braking).

BRIEF DESCRIPTION OF THE DRAWING

The above and other objects, features and advantages of the present invention will become more readily apparent from the following description, reference being made to the accompanying drawing in which.

FIGS. *3a* and *3b* are diagrams illustrating the actuation of the clutches in accordance with the present invention.

SPECIFIC DESCRIPTION

Figure 1:
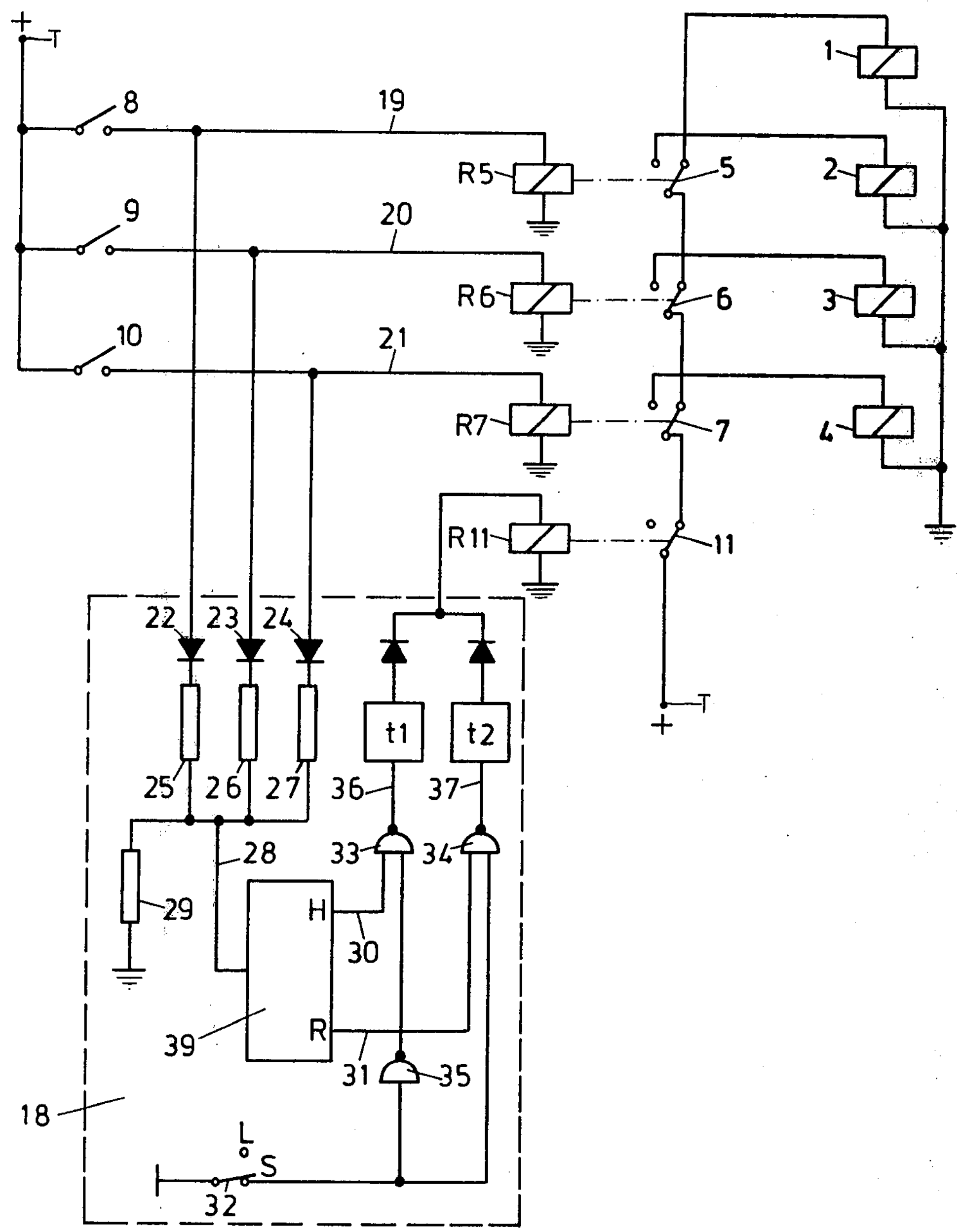
FIG. 1 is a circuit diagram of a system for controlling the shifting of the gears of a load-shiftable transmission in accordance with the present invention.

In the circuit of FIG. 1 the electromagnetic valves 1, 2, 3 and 4 associated with respective speeds of transmission, are given the same numbers as the correspondingly numbered speeds, i.e. first gear, second gear, third gear and fourth gear. The electromagnetic valves 1 to 4 are actuated by single-pole double-throw switchover or changeover contacts or switches 5, 6, 7, connected in a series circuit. In other words, one side of each of the switches 5–7 is connected through the movable switch member to the corresponding side of the next switch, etc.

With the switch in the position shown in FIG. 1, the electromagnetic valve 1 is energized, this valve being connected between ground and the positive terminal T of the vehicle battery or another source. In the position shown of the switches 5–7, therefore, first gear or first speed of the transmission is "on."

To shift to second speed, the switch 5 is reversed, thereby applying voltage to the second electromagnetic valve 2. When switch 6 is reversed, third speed is initiated by energization of the electromagnetic valve 3 and fourth speed is selected by switchover of contacts 7. When each switch 7 is switched over from the position shown in FIG. 1, the lower-speed electromagnetic valves are cut off from the source T.

The switchover contacts 5–7 are each operated by the respective relay $R_5$, $R_6$ and $R_7$, respectively, the relays being connected via conductors 19, 20 and 21 through respective control switches 8, 9, 10 to the positive terminal T of the voltage source. Switches 8, 9 and 10 are the speed selection switches and are either manually operated or are operated by an automatic speed-changing system of the vehicle in a manner known per se (see U.S. Pat. No. 4,026,169).

If, for example, selection of second speed is desired, switch 8 is closed to energize the relay $R_5$ and reverse the position of contacts 5. Similarly selective closure of switches 9 and 10 will energize relays $R_6$ and $R_7$ to reverse the contacts 6 and 7.

Ahead of the input to the contacts 5–7 of the chain, e.g. ahead of the input to contact 7, there is provided an interrupter contact 11 which is actuated by the relay $R_{11}$.

Upon open circuiting of the contact 11, the remainder of the switch chain 5–11 is deenergized. Thus, the interrupter contact 11 can deenergize any previously energized valve 1–4 for a predetermined time period and can permit delayed draining of the respective friction clutch for this period.

Figure 2:
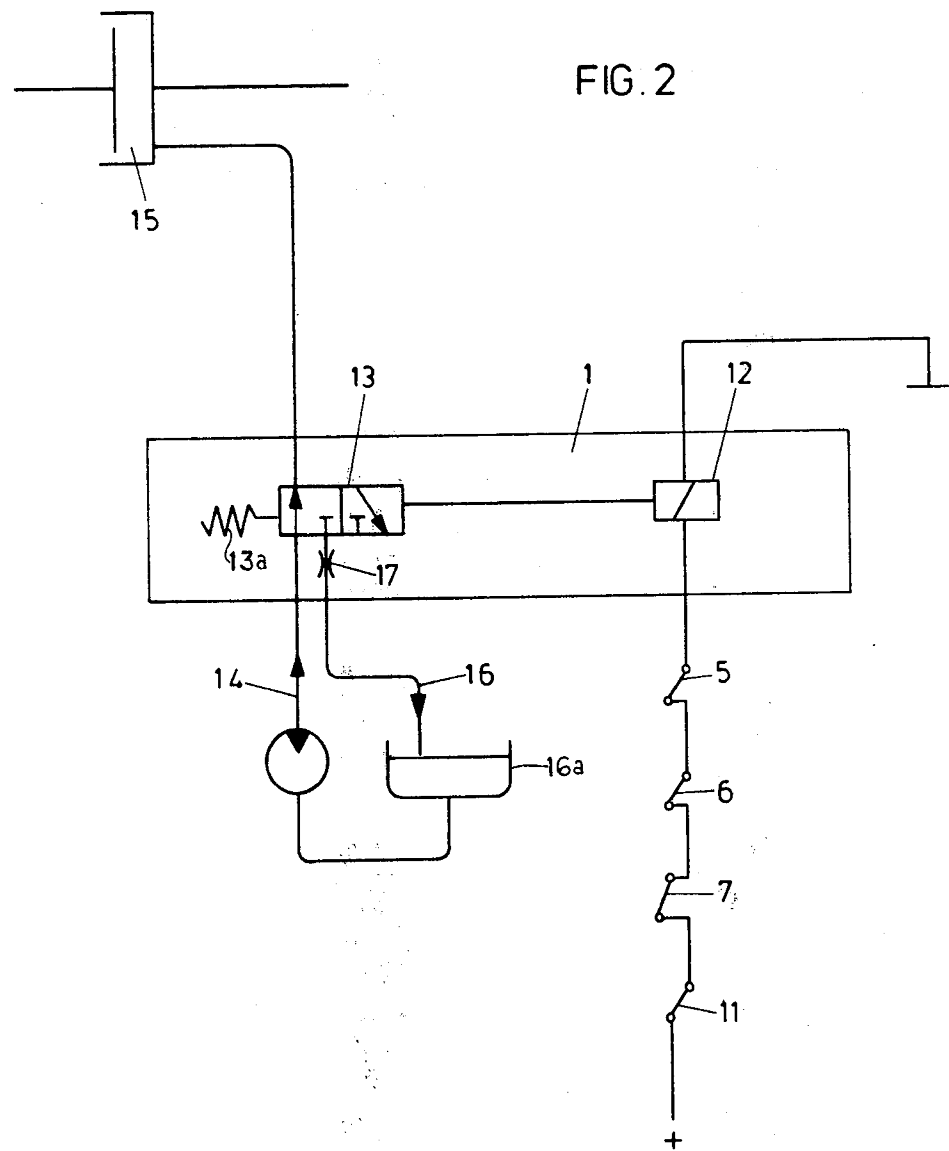
FIG. 2 is a diagram showing the electromagnetic valve used in this system.

FIG. 2 shows in somewhat greater detail the particular valve construction which may be used. Each of the magnetic valves is provided with a coil 12 which is energized through the respective switchover contacts 5–7 and the interrupter contact 11 (see FIG. 1). The armature of the coil 12 is connected to the valve spool or slider 13. The valve 13 can be a 2-position, 3-port valve, one port of which is connected to the hydraulic actuator 15 of the respective friction clutch while another port is connected to the pressure line 14 of a pump and the third port is connected via a throttle 17 and a return line 16 to the reservoir **16*a*** supplying the pump.

Upon energization of the coil 12 the slider 13 is shifted to open a passage from the pressure line 14 to the clutch 15. The clutch is thereby actuated to connect the appropriate gear train between the input and output shafts of the transmission. When the coil 12 is deenergized, e.g. by reversal of an appropriate contact 5–7 or by opening of the interrupter contact 11, slider 13 is shifted by a spring **13*a* into a position in which the clutch 15 is drained through the throttle 17 to the reservoir 16*a***. The throttle ensures slow release of each previously actuated clutch.

Let us assume that the system shown in FIGS. 1 and 2 is to be upshifted under load from the first speed to the second speed and an overlapping of the operation of the first and second clutches is desired. In this case, switch 8 is closed and energizes the relay $R_5$ to switch contacts 5 and connect the electromagnetic valve 2 into the circuit. In this operating phase, relay $R_{11}$ is unenergized. Contact 11 remains closed and the first clutch (previously energized by contacts 5 through the electromagnetic valve 1) is deactivated and slowly drains through its throttle. Hydraulic fluid, however, is fed through an unthrottled path to the clutch of valve 2 and this clutch is filled, bringing about a maximum overlap of the operation of the first and second clutches. This overlap will be apparent from FIG. *3a*. In this figure the curves $S_1$ and $S_2$ represent the voltages at the electromagnetic valves 1 and 2. The first voltage falls and the second voltage rises at the initiation $t_i$ of the switching operation. The pressure in the first speed clutch 15/1 progressively falls while the pressure in the second speed clutch 152 progressively increases so that an overlap of clutch operations takes place over the time span A. This time span A is a function, of course, of the effect of the throttle 17.

During the overlap, the clutches slip sufficiently to prevent locking of the transmission and neither clutch is at full operating pressure. A single transition from first to second speeds is effected.

Should a downshifting under load without overlapping be desired, for example, from second speed to first speed, simultaneously with the opening circuiting of contact 8, the relay R11 is energized and the interrupter switch 11 opened. In this case, the electromagnetic valve 2 for the second speed is deenergized and the pressure in the corresponding clutch follows as represented by the curve 15/2 of FIG. 3*b* from the initiation of the switchover. Upon lapse of the predetermined time (B) corresponding to the delay in reclosing of switch 11, which can correspond to the drain time A of the clutch through its throttle 17, switch 11 recloses and contact 5, which has previously been shifted into the position shown in FIG. 1, is effective to throw the electromagnetic valve 1 into its "ON" position.

For the duration of opening of the interrupter contact 11, naturally, electromagnetic valve 1 cannot be enabled in spite of the fact that its contact 5 has previously been connected in series therewith.

Thus, upon the lapse of time period B corresponding to the open time of the switch 11, valve 1 is operated and the pressure brought up in the first speed clutch is effected as represented by the curve 15/1. Thus only when the second speed clutch has been fully drained is the filling of the first speed clutch begun and there is no overlap in clutch operation.

So that the interrupter contact 11 can be opened and closed in accordance with the direction of shifting (upshifting H or downshifting R) and in dependence upon the driving condition (overload L or under inertial push S), a logic circuit 18 is provided as has been shown in FIG. 1.

The logic circuit comprises three coupling diodes 22, 23, 24 connected respectively to the lines 19, 20 and 21 containing the switches 8, 9 and 10, the diodes 22 through 24 being connected through respective resistors 25, 26 and 27 which are tied together in series with a resistor 29 connected to ground. The resistors 25, 26 and 27 which are tied together in series with a resistor 29 connected to ground. The resistors 25, 26 and 27 have different ohmic resistance and each, upon the closure of a respective switch 8, 9 or 10, forming respective voltage dividers the output of which is applied to an integrated-circuit sensor 39 of conventional construction. Depending upon whether the voltage change is up or down, the sensor 39 provides an output H or an output R representing upshifting and downshifting respectively.

In other words, if conductor 28 receives a reduced potential upon switchover among the switches 8 through 10 downshifting is indicated and a potential is developed at line 31 connecting the R output of the voltage-direction sensor 39. Line 31 applies this signal to one terminal of a NAND gate 34.

The output 30 representing upshifting condition is applied to a NAND gate 33.

The circuit 18 also includes a single-pole double-throw switch 32 which selects between the L (load or traction operation of the vehicle) and S (inertial or downhill travel) states thereof. The switch 32 is connected to one of the inputs of NAND gate 34 directly and through an inverter 35 to the other input of NAND gate 33. The NAND gates 33 and 34 constitute coincidence circuits. The coincidence circuits 33 and 34 produce outputs 36 and 37 through respective diodes in accordance with the following truth table:

Upshifting H under inertial or downhill travel S-signal on line 36.

Downshifting R under load-signal on line 37.

Figure 3A:
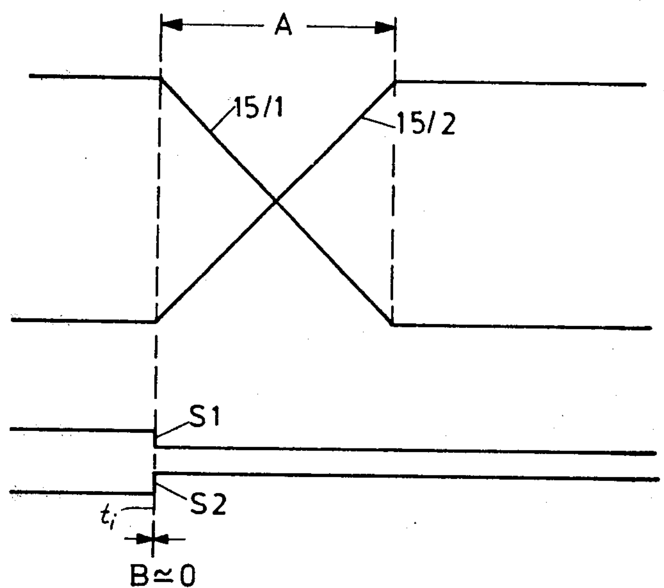
Figure 3B:
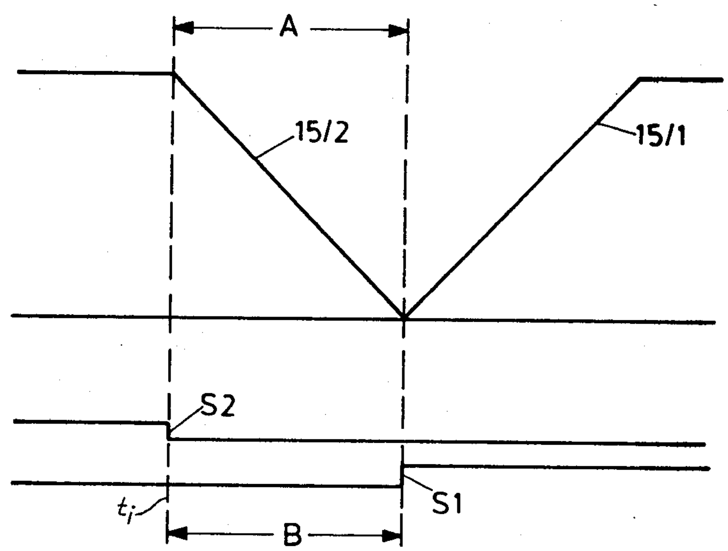

In the first case, the relay $R_{11}$ is energized via time delay network t1 and in the second case through time delay t2 which can have the same or different time constants and which determine the degree of overlap between the states shown in FIGS. 3*a* and 3*b*; upon upshifting under load and downshifting under inertial or downhill travel, neither at the NAND gates has a potential of its output so that the relay $R_{11}$ is not energized and full overlapping occurs as shown in FIG. 3*a*. Naturally, the time-constant networks t1 and t2 can be dimensioned to permit full draining of a previously energized clutch before the subsequently energized clutch is energized.

We claim:

1. In a system for the electrohydraulic operation of respective friction devices of a multispeed transmission to select respective speeds thereof, wherein each of said devices is connected to a respective electromagnetic valve through which the device is hydraulically filled and emptied, the improvement wherein said system comprises respective working contacts operated by respective working relays and in circuits with each of said electromagnetic valves, said working contacts being connected in a series chain with a voltage source whereby selective operation of each of the working contacts selects a respective speed by energization of a respective valve, an interrupter contact connected in a common series circuit with said source and said chain, detector means responsive to upshifting or downshifting operation of said working contacts, and timing means connected to said detector means and to said interrupter contact for open circuiting same and the series connection of the chain with its source for a predetermined time period and thereafter closing same upon operation of at least one of said working contacts by said working relays to establish an overlap between operations of said devices in the shifting from at least one speed of the transmission to another speed thereof.

2. The improvement defined in claim 1 wherein a respective working relay is connected in circuit with a respective operating switch and actuates a respective working contact, each of said operating switches being connected in series with a respective voltage divider, said detector means being connected to said voltage dividers and responding to a decrease or increase of the detected potential.

3. The improvement defined in claim 2, further comprising logic circuit means connected with said detector means and with said interrupter contact for controlling the duration of opening of said interrupter contact in dependence upon the direction of shifting speeds of the transmission, said logic circuit including load monitoring means responsive to the loading or inertial operation of the transmission for controlling the duration of opening of said interrupter contact, and a plurality of coincidence gates connected to said detector means, said load-monitoring means and said interrupter contact for selectively operating same.

4. The improvement defined in claim 3 wherein each of said working contacts is a single-pole double-throw switch operated by a respective working relay, one terminal and the switching member of each of said switches being connected in series to form said chain, said interrupter contact being operated by an interrupter relay, said logic circuit including at least two time delaying networks selectively connectable in an energizing circuit with said interrupter relay.

5. The improvement defined in claim 1, 3, 4 or 2 wherein each of said electromagnetic valves includes a valve member shiftable upon electrical energization between a first position wherein the respective device is connected to a fluid pressure source and a second position wherein the respective device is drained in series with a respective throttle.

* * * * *